United States Patent

Ueda et al.

[11] Patent Number: 5,843,217
[45] Date of Patent: Dec. 1, 1998

[54] INK FOR INK JET RECORDING

[75] Inventors: Takamasa Ueda, Ibaraki; Tomoko Yamamoto, Takarazuka; Hideo Hotomi, Nishinomiya, all of Japan

[73] Assignee: Minolta Co., Ltd., Osaka, Japan

[21] Appl. No.: 948,971

[22] Filed: Oct. 10, 1997

[30] Foreign Application Priority Data

| Oct. 11, 1996 | [JP] | Japan | 8-269869 |
| Oct. 11, 1996 | [JP] | Japan | 8-269872 |
| Oct. 11, 1996 | [JP] | Japan | 8-269873 |
| Oct. 11, 1996 | [JP] | Japan | 8-269875 |

[51] Int. Cl.$^6$ ................................. C09D 11/02
[52] U.S. Cl. ................... 106/31.48; 106/31.58; 106/31.59
[58] Field of Search ............ 106/31.48, 31.59, 106/31.58; 534/797

[56] References Cited

U.S. PATENT DOCUMENTS

| 3,647,778 | 3/1972 | Andrew et al. | 534/634 |
| 4,285,727 | 8/1981 | Uehara et al. | 106/31.43 |
| 4,299,630 | 11/1981 | Hwang | 106/31.43 |
| 4,325,735 | 4/1982 | Ohta et al. | 106/31.49 |
| 4,421,559 | 12/1983 | Owatari | 106/31.43 |
| 4,737,190 | 4/1988 | Shimada et al. | 106/31.38 |
| 4,853,037 | 8/1989 | Johnson et al. | 106/31.43 |
| 4,908,062 | 3/1990 | Balmforth et al. | 106/31.48 |
| 5,108,503 | 4/1992 | Hindagolla et al. | 106/31.47 |
| 5,211,747 | 5/1993 | Breton et al. | 106/31.34 |
| 5,262,527 | 11/1993 | Gregory et al. | 106/31.48 |
| 5,268,459 | 12/1993 | Gregory et al. | 106/31.48 |
| 5,356,464 | 10/1994 | Hickman et al. | 106/31.36 |
| 5,374,301 | 12/1994 | Gregory et al. | 106/31.48 |
| 5,397,386 | 3/1995 | Nakazawa et al. | 106/31.51 |
| 5,431,722 | 7/1995 | Yamashita et al. | 106/31.43 |
| 5,451,251 | 9/1995 | Mafune et al. | 106/31.48 |
| 5,609,673 | 3/1997 | Takimoto et al. | 106/31.48 |
| 5,616,694 | 4/1997 | Kenyon et al. | 106/31.48 |
| 5,749,951 | 5/1998 | Yoshiike et al. | 106/31.48 |

FOREIGN PATENT DOCUMENTS 0559310  9/1993  European Pat. Off. ......... 106/31.48

*Primary Examiner*—Helene Klemanski

[57] ABSTRACT

This invention relates to the ink for ink-jetting using water-soluble reactive dye represented by general formula (A):

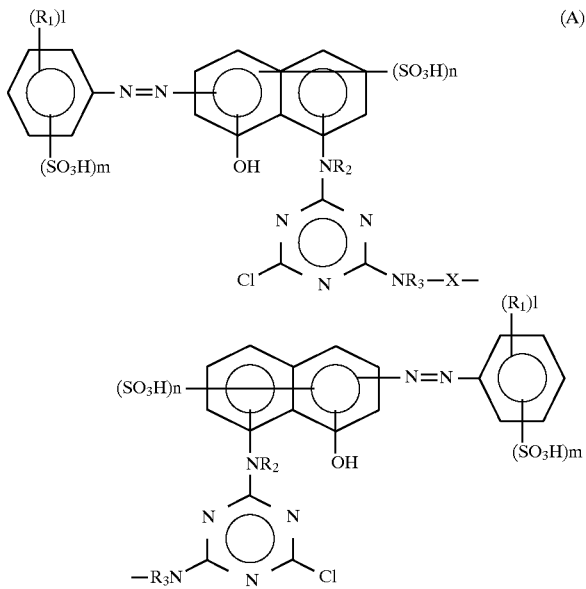

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or —$NR_3$—X—$R_3N$— represents 1,4-pyperazinylene group, M is alkaline metal, quaternary ammonium or hydrogen atom, n is an integer of 1 to 5, m is an integer of 1 to 5 and "l" is 5−m, and by using those dyes as magenta dye excellent light resistance and water resistance are given to the ink.

43 Claims, No Drawings

INK FOR INK JET RECORDING

BACKGROUND OF THE INVENTION

1. Field of the Invention

This invention relates to an ink used in ink-jetting recording printer.

2. Description of the Prior Art

Generally, as the ink used for inkjet type recording printer, the inks which are prepared by dissolving various water-soluble dyes to water or medium consisting of water and various organic solvents are mainly known, and in order to reproduce original color image the inks having each color of yellow, cyan, magenta and black are put into practical use. In such ink used for reproducing color image it is needed that reproducibility of color is excellent and the produced image is excellent in water resistance and light resistant.

But in conventional magenta ink using water-soluble magenta dyes, ones having excellent reproducibility of magenta color are not enough in water resistance or light resistance and ones having excellent water resistance and light resistance are not enough in reproducibility of color. Any of them are not satisfied in the above performance.

In addition to those, magenta ink needs to be excellent in stability of reservation bearable to sudden change of temperature, ability of preventing clogging at the vomitry part of the head and antifungal property, etc.

SUMMARY OF THE INVENTION

The object of this invention is to provide ink for ink-jetting which is excellent both in the water resistance and light resistance of printed matter and reproducibility of color.

Another object of this invention is to provide ink for ink-jetting which is excellent in the stability of reservation bearable to sudden change of temperature.

Another object of this invention is to provide ink for ink-jetting which is excellent in ability of preventing clogging at the ink-jet shot part.

Another object of this invention is to provide ink for ink-jetting which is excellent in fungicidal property.

Another object of this invention is to provide ink for ink-jetting with little fluctuation in dot-diameter.

Another object of this invention is to provide ink for ink-jetting which is excellent in stability of reservation to the change of humidity.

Another object of this invention is to provide ink for ink-jetting characteristics of which is stably retained to the change of temperature.

The first subject matter of this invention relates to ink for ink-jetting at least containing water-soluble dye and water, comprising 0.1–5 wt. % of water-soluble dyes represented by general formula (A):

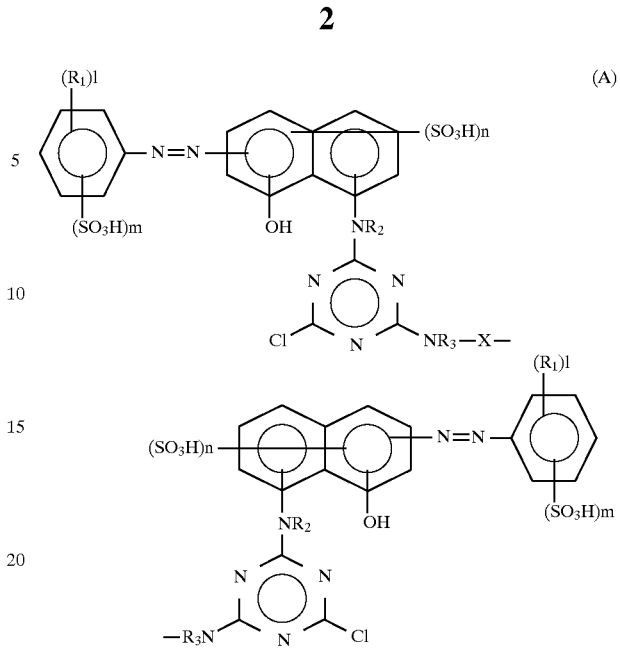

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or —$NR_3$—X—$R_3N$— represents 1,4-pyperazinylene group, M is alkaline metal, quaternary ammonium or hydrogen atom, n is an integer of 1 to 5, m is an integer of 1 to 5 and "l" is 5–m, and 2–8 wt. % of polyethylene imine.

The second subject matter of this invention relates to ink for ink-jetting at least containing water-soluble dye and water, comprising 0.1–5 wt. % of water-soluble dyes represented by general formula (A):

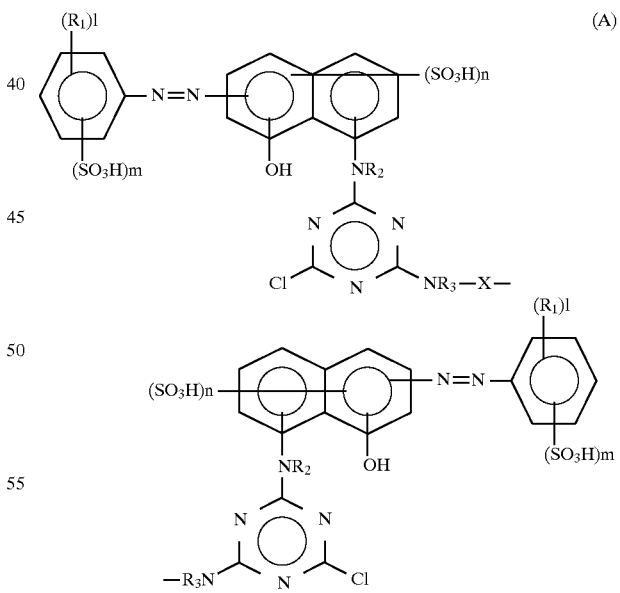

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or —$NR_3$—X—$R_3N$— represents 1,4-pyperazinylene group, M is alkaline metal, quaternary ammonium or hydrogen atom, n is an integer of 1 to 5, m is an integer of 1 to 5 and "l" is 5–m, and 0.01–2 wt. % of the mixture of NaOH and at least one compound selected from the group consisting of $NaHCO_3$ and $Na_2B_4O_7$.

The third subject matter of this invention relates to ink for ink-jetting at least containing water-soluble dye and water, comprising 0.1–5 wt. % of water-soluble dyes represented by general formula (A):

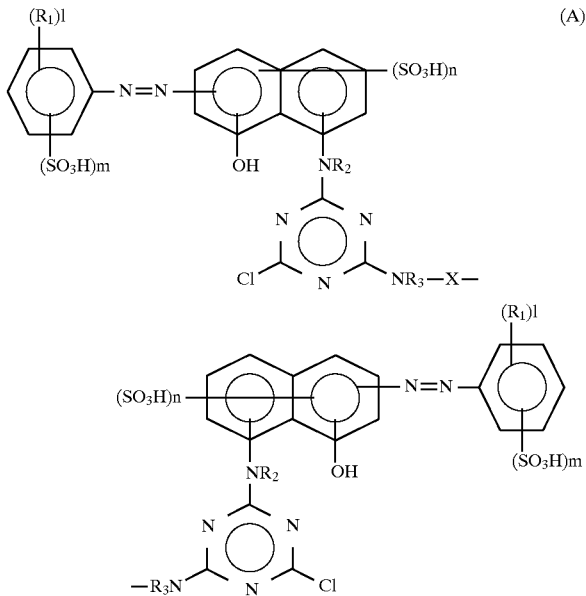

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or $-NR_3-X-R_3N-$ represents 1,4-pyperazinylene group, M is alkaline metal, quaternary ammonium or hydrogen atom, n is an integer of 1 to 5, m is an integer of 1 to 5, and "l" is 5–m, and 0.01–2.0 wt. % of alkaline metal salts of ethylenediaminetetraacetic acid.

The fourth subject matter of this invention relates to ink for ink-jetting at least containing water-soluble dye and water, comprising 0.1–5 wt. % of water-soluble dyes represented by general formula (A):

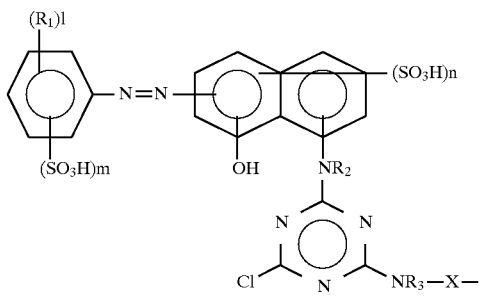

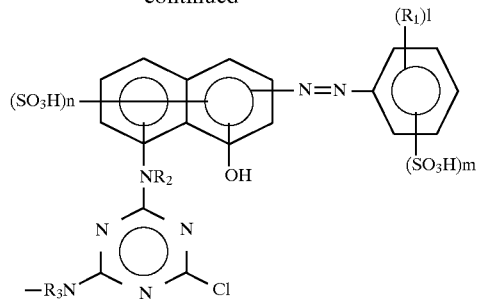

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or $-NR_3-X-R_3N-$ represents 1,4-pyperazinylene group, M is alkaline metal, quaternary ammonium or hydrogen atom, n is an integer of 1 to 5, m is an integer of 1 to 5 and "l" is 5–m, and 0.01–5 wt. % of alkylene oxide addition product to acetylene glycol shown by general formula (B):

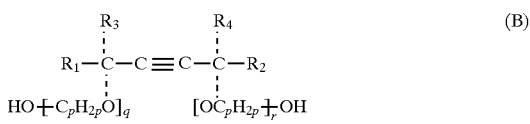

wherein $R_1$, $R_2$, $R_3$ and $R_4$ is alkyl group having 1–5 carbons, p is an integer of 2 or 3, q and r each is an integer of more than 1.

THE DETAILED DESCRIPTION OF THE INVENTION

As coloring material (water-soluble dye) used in the ink of this invention, a reactive dye shown by general formula (A):

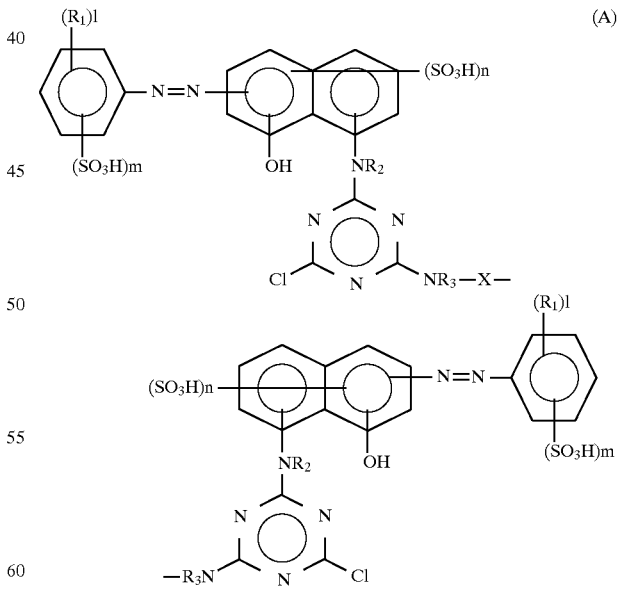

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or $-NR_3-X-R_3N-$ represents 1,4-pyperazinylene group, M is alkaline metal, quaternary ammonium or hydrogen atom, n is an integer of 1 to 5, m is an integer of 1 to 5 and "l" is 5–m. And in the case that more than two $R_1$s are contain in the same aryl group, $R_1$ may represent different group or atom (for example hydrogen atom and methyl group), is used. In the formula (A), lithium, sodium and potassium and the like are exemplified as alkaline metals M. And as quaternary ammonium compounds, $NH(CH_3)_3$, $NH(CH_2CH_2OH)_3$, $NH_2(CH_3)_2$, $NH_2(CH_2CH_3)_2$, $NH_2(CH_3)(CH_2CH_3)$, $NH_3(CH_3)$, $NH_3(CH_2CH_3)$ and $NH_3(CH_2CH_2OH)$ and the like. Excellent light resistance and water resistance are given to the ink by using those dyes as magenta dye. Those dyes are included in amount of 0.1–5 wt. %, preferably 1–4 wt. % in the ink.

In the case that the content of those dyes is less than 0.1 wt. %, the coloring of the ink is not enough, while in the case of more than 5 wt. % the dye in the ink is liable to deposit because of the factors of the change of environment etc. and owing to this the stability of the ink is lowered. If necessary to control tone of the color, the other water-soluble dyes (for example, acid dyes, direct dyes, basic dyes, reactive dyes or edible dyes etc) may be used in the range of not more than 50 wt. % in terms of water-soluble dye represented by formula (A).

As the preferable magenta dyes represented formula (A) in this invention, the followings are exemplified:

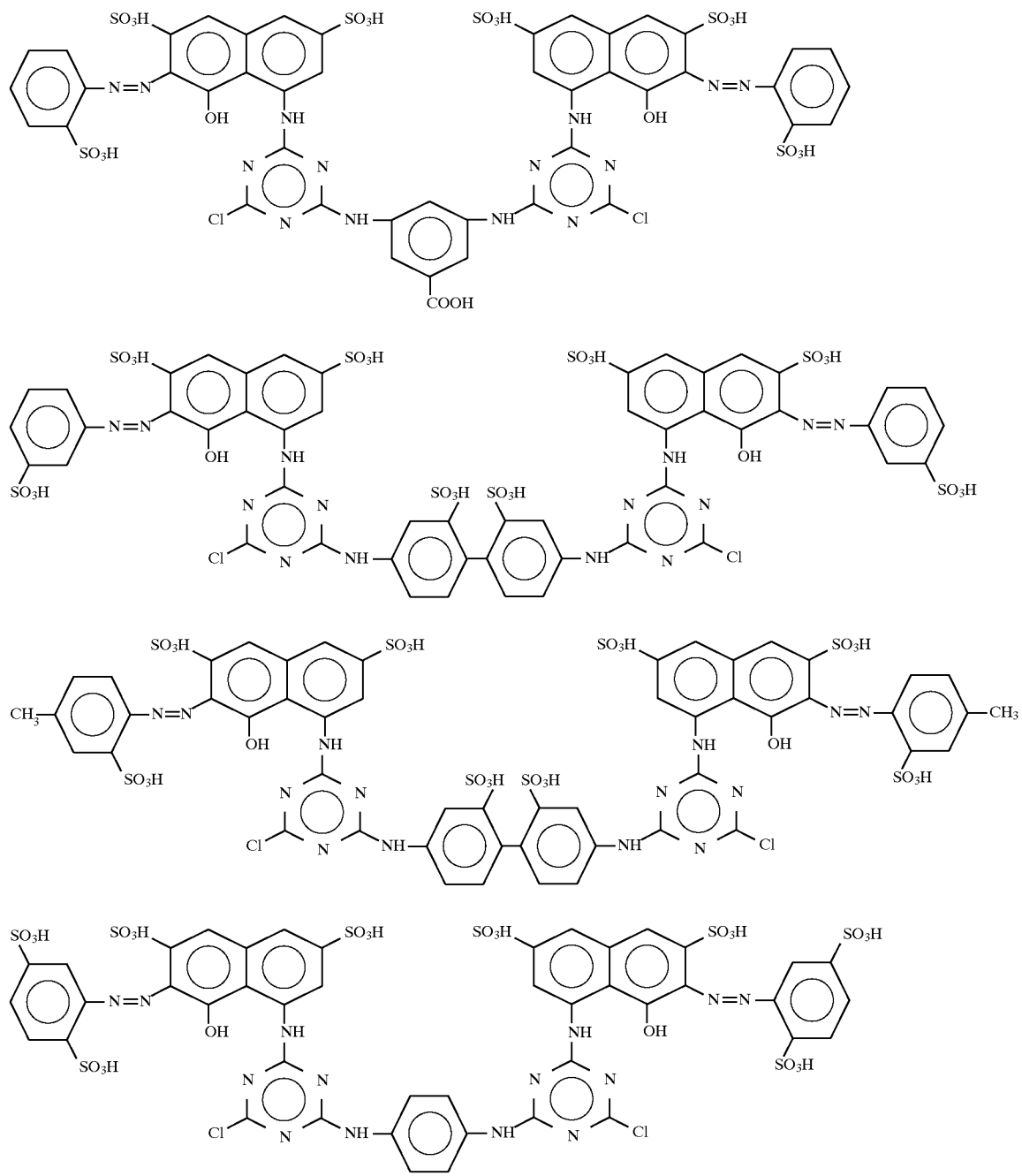

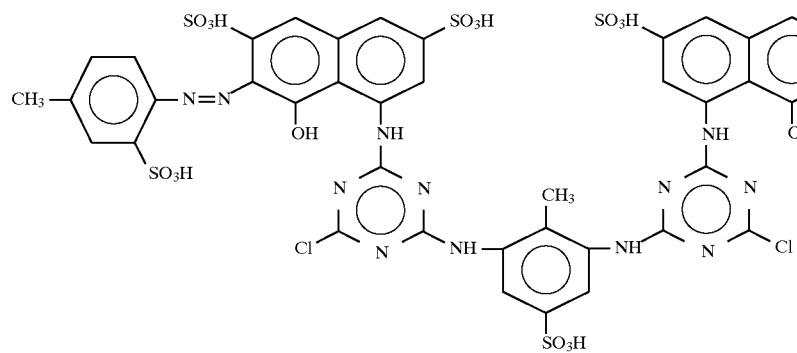
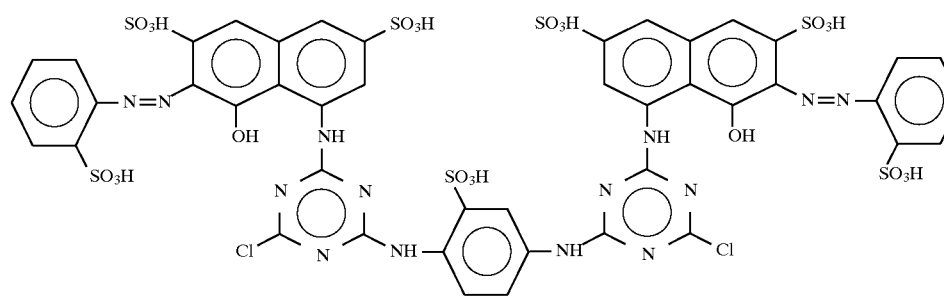
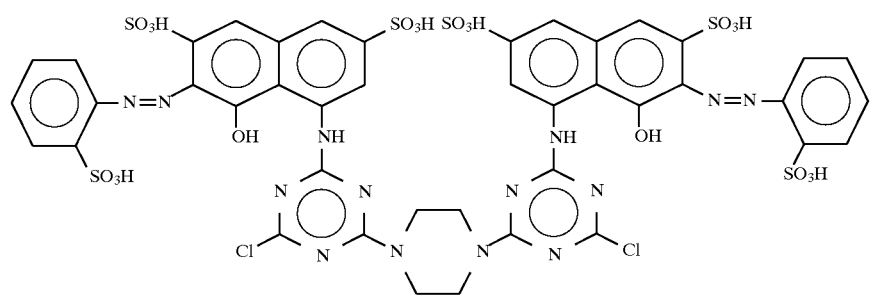
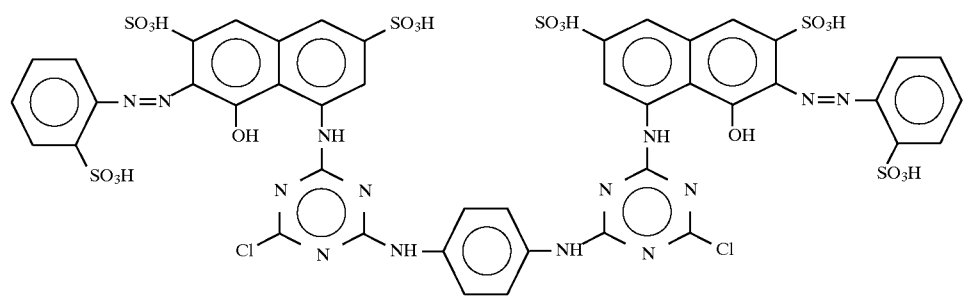
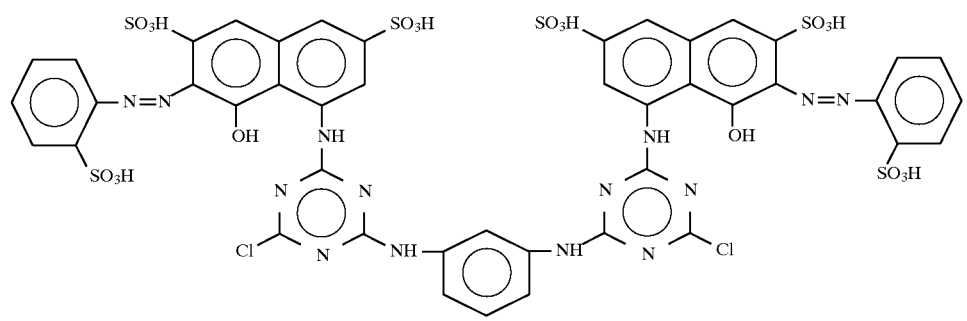

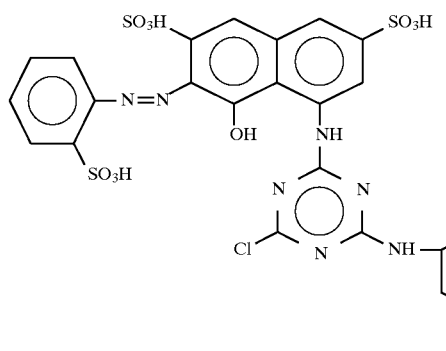
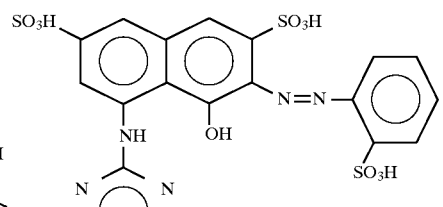

In the ink of the first matter of this invention, 2–8 wt. %, preferably 3–7 wt. % of polyethylene imine are included for the purpose of improving the stability of the ink to the sudden change of temperature, improving the prevention of clogging, and improving the fungicidal property. In the case that the amount of addition of polyethylene imine is less than 2 wt. %, above effects are not enough, and in the case of more than 8 wt. % of polyethylene imine stability of reservation of the ink is lowered. Molecular weight of polyethylene imine is preferably 200–10000, more preferably 250–2000. As long as the molecular weight of polyethylene imine is in the above range and they remain water-soluble, they can be used irrespective of the degree of branch. As the examples of polyethylene imine which can be used in this invention, SP-series "Epomine" (registered trademark) from Nihonsyokubai Co.,Ltd. and the derivatives such as the reaction products between polyethylene imine and ethylene oxide, the reaction products of alcohols or amines to polyethylene imines are exemplified.

In the ink of the second matter of this invention, mixture of NaOH and at least one compound selected from the group consisting of $NaHCO_3$ and $Na_2B_4O_7$ is included. By addition of these compounds it becomes possible to raise the stability of the ink to sudden change of temperature and to prevent the fluctuation of dots. As above effects can be obtained in the case of neither more nor less amount of the addition, the amount of them need to be in the range of 0.01–2.0 wt. %, preferably 0.05–1.0 wt. %. And the weight ratio of NaOH and $NaHCO_3$ and/or $Na_2B_4O$ in the mixture is adjusted to 1:2–1:5, preferably 1:5–1:30.

In the ink of the third matter of this invention, alkaline metals of ethylenediaminetetraacetic acid are contained. By containing them it becomes possible to improve prevention of the clogging of ink at shooting opening of nozzles and to improve the stability of reservation of the ink to environmental change of temperature or humidity. Examples of alkaline metal salts of ethylenediaminetetraacetate acid are disodium ethylenediaminetetraacetate, trisodium ethylenediaminetetraacetate, tetrasodium ethylenediaminetetraacetate, preferably tetrasodium ethylenediaminetetraacetate. In the case that the content of them is too small, its effect is insufficient and in the case that it is too large, its effect becomes small, therefore they are includes in the amount of the range of 0.01–2.0 wt. %, preferably 0.05–1.0 wt. % in the ink.

In the ink of the fourth matter of this invention, alkylene oxide addition product to acetylene glycol shown by general formula (B) is included. By including this it becomes possible to prevent blurring of the ink as well as to stabilize shooting property of the ink from nozzle of the ink-jetting apparatus. Besides by including this the stability to the change of temperature of surface tension and viscosity of aqueous ink using above dye can be raised.

In formula (B), $R_1$ and $R_2$ are the same lower alkyl groups which may have branches of $C_1$–$C_5$, preferably lower alkyl groups of $C_2$–$C_4$, particularly preferably isobutyl groups. $R_3$ and $R_4$ are the same lower alkyl groups having $C_1$–$C_5$, preferably methyl groups. The examples of additional alkylene oxides are preferably ethylene oxide, propylene oxide or random or block co-additional compound, particularly preferably ethylene oxide. q and r may be the same or the different and q+r is 2–60, preferably 2–30, more preferably 6–20.

As the example of alkylene oxide addition products of acetylene glycol, "Olfine E-1004" (q+r=3.5) (Nisshin Kagaku Kogyo K.K.) and "Olfine E-1010" (q+r=10) (Nisshin Kagaku Kogyo K.K.) available as articles in which $R_1$ and $R_2$ are isobutyl, $R_3$ and $R_4$ are methyl and l=2, and Surfynol 485 (q+r=30)(AIR PRODUCTS Co. Ltd.; U.S.A.) are known, and each of them is preferably applied to the ink of this invention.

In the ink of this invention, alkylene oxide addition products of acetylene glycol are included in the range of 0.01–5 wt. %, preferably 0.1–5 wt. %, more preferably 0.1–2 wt. %. In the case that the amount of addition of alkylene oxide addition products of acetylene glycol is less than 0.01 wt. %, the effect of increasing the stability is insufficient, and in the case of more than 5 wt. % the stability of ink to the change of temperature is lowered, therefore neither case are preferable.

In water-soluble organic solvents used in the ink of this invention, compounds selected from group consisting of polyvalent alcohols having three hydroxide, (mono, di, tri)alkylene glycols shown by formula (C):

$$HO(C_xH_{2x}O)_yH \qquad (C)$$

(in the formula, x and y are the integer of $2 \leq x$ and $2 \leq xxy \leq 6$), lower alkyl ether of above (mono, di, tri) alkylene glycols and mixture thereof are preferably contained.

As polyvalent alcohols having three hydroxide groups, glycerin etc. is exemplified.

As the (mono, di, tri)alkylene glycol, monoalkylene glycols such as ethylene glycol, propylene glycol, butylene glycol, hexylene glycol etc., dialkylene glycols such as diethylene glycol, dipropylene glycol etc., trialkylene glycols such as triethylene glycol etc., are exemplified.

As the lower alkylether of (mono, di, tri)alkylene glycol, ethyleneglycol methylether, ethyleneglycol ethylether, diethyleneglycol methylether, diethyleneglycol ethylether, diethyleneglycol butylether, triethyleneglycol butylether, and the like are exemplified.

In the case that polyvalent alcohols as water-soluble organic solvent are used, they are used in amount of 1–20 wt. %, preferably 6–14 wt. % in terms of total weight of ink. In the case that (mono, di, tri)alkylene glycols are used, they are used in amount of 1–30 wt. %, preferably 6–14 wt. % in terms of total weight of ink. And in the case that the lower alkyl ether (mono, di, tri)alkylene glycols are used, they are used in amount of 1–30 wt. %, preferably 4–10 wt. % in terms of total weight of the ink.

As for above water-soluble organic solvents, only one kind of them may be used and more than two kinds of them may be used.

When polyethylene imines and above water-soluble organic solvent are used together, total content of them is preferably 10–30 wt. %, more preferably 13–25 wt. %.

In the ink of this invention, polyalkylene glycol having the molecular weight of more than 150, preferably of 150–600 may be included, too. As the polyalkylene glycol, polyethylene glycol, polypropylene glycol, polytetramethylene glycol and copolymer from ethylene oxide and propylene oxide are used, preferably. Particularly preferable polyalkylene glycol are polyethylene glycol having molecular weight of 150–600. The content of polyalkylene glycol is preferably 2–8 wt. % in terms of total weight of the ink.

Addition of above polyvalent alcohols, (mono, di, tri) alkylene glycols, lower alkylethers of (mono, di, tri)alkylene glycol and polyalkylene glycols improve moisture retension property of the ink and besides are helpful to stabilize viscosity and surface tension.

Polyvalent alcohols, (mono, di, tri)alkylene glycols, lower alkylethers of (mono, di, tri)alkylene glycol and polyalkylene glycols are added so that the total amount of them come to 10–30 wt. %, preferably 13–25 wt. % in terms of total amount of the ink. When the amount of addition is less than 10 wt. %, above effect cannot be obtained, and when it is more than 30 wt. %, the viscosity of the ink becomes too high, and owing to this flight responsibility and ink-supply property go down and fixing speed become late too, so it is not preferable.

As the solvent for the water-soluble dyes of this invention, water is used along with organic solvent. The content of water occupies 60–90 wt. %, preferably 70–90 wt. % in the ink.

To the ink for ink-jetting, many kinds of below supplementary substances other than above components may be added to improve the properties of the ink.

In the case that high drying speed of the ink is needed in order to improve fixing ability of ink, aliphatic alcohols having 1–5, preferably 1–3 of carbon atoms such as methyl alcohol, ethyl alcohol, isopropyl alcohol etc. are used. These alcohols are included in amount of 0.1–15 wt. %, preferably 1–6 wt. % in the ink.

And in order to prevent blurring of the ink as well as to stabilize vomiting property from nozzle of recording apparatus of inkjet, it is preferable to add surfactant to the ink and to adjust surface tension to 30–50 dyne/cm (liquid temperature is 25° C.). As such surfactant any one of nonion, anion or cation surfactants may be added, but the addition of nonion surfactants is preferable, because anion or cation surfactants are liable to cause the deposition of salts. Among the nonion surfactants, alkylene oxide addition products of acetylene glycol shown by above general formula (B) are preferable.

In order to improve the ability for preventing deposition of crystal in the ink, amphiphilic substance such as urea, amides, cyclic amides, alkanol amines may be added into the ink. Alkanol amines such as triethanol amine are particularly preferable. Amphiphilic substance may be added in amount of 0.01–5 wt. %, preferably 0.1–2 wt. % in the ink.

Besides, known additives other than above components may be added optionally, and as such additives, antifungals, antiseptics, pH adjusting agents, chelating agents, oxygen absorbents, anticollosive, quencher and the like can be exemplified.

The ink for ink-jetting can be applied to any kind of printers as long as they are ink-jetting type. Particularly, this ink can be preferably applied to ink-jetting apparatus using piezo method, and particularly preferably to ink-jetting apparatus which are piezo type and reproduce gradation by changing jetting ink diameter (the amount of ink) through changing flight voltage of the ink.

EXAMPLES

This invention will be explained in more detail by examples.

The components described in below examples and comparative examples are mixed and dissolved by agitating thoroughly. After resulting agitated mixtures were filtered, filtrates were let alone for 1 hour under vacuum and degassed ink were prepared.

Example 1

| Composition | Ratio(wt. %) |
| --- | --- |
| water | 70.9 |
| diethylene glycol | 10.0 |
| triethylene glycol | 7.0 |
| polyethylene imine "Epomine SP-006" (molecular weight: ca.600, Nihon Syokubai K.K.) | 6.0 |
| water-soluble dye[M = Na in compound(3)] | 2.6 |
| surfactant "Olfine-E1010" (Nisshin kagaku kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Example 2

| Composition | Ratio(wt. %) |
| --- | --- |
| water | 75.65 |
| diethylene glycol | 10.0 |
| triethylene glycol butylether | 7.0 |
| polyethylene imine "Epomine SP-006" | 4.5 |
| water-soluble dye[M = Na in compound(3)] | 1.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.05 |
| antifungal:1,2-benzoisothiazoline-3-on | 0.1 |

Example 3

| Composition | Ratio(wt. %) |
| --- | --- |
| water | 72.0 |
| diethylene glycol | 10.0 |
| triethylene glycol butylether | 7.0 |
| polyethylene imine "Epomine SP-012" (molecular weight: ca.1200, Nippon Syokubai K.K.) | 4.0 |

-continued

| Composition | Ratio(wt. %) |
|---|---|
| water-soluble dye[M = Na in compound(3)] | 2.5 |
| surfactant "Olfine-E1010" (Nissin Kagaku Kogyo K.K.) | 0.8 |
| triethanol amine | 0.2 |
| Na$_2$B$_4$O$_7$/NaOH(19/1) | 0.2 |
| tetrasodium ethylenediaminetetraacetate | 1.7 |
| antifungal:1,2-benzoisothiazoline-3-on | 0.1 |
| ethanol | 1.5 |

Example 4

| Composition | Ratio(wt. %) |
|---|---|
| water | 71.5 |
| diethylene glycol | 10.0 |
| triethylene glycol butylether | 7.0 |
| polyethylene imine "Epomine SP-006" | 4.5 |
| water-soluble dye[M = Na in compound(3)] | 4.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| isopropylalcohol | 1.0 |

Example 5

| Composition | Ratio(wt. %) |
|---|---|
| water | 79.6 |
| diethylene glycol | 10.0 |
| triethylene glycol | 4.0 |
| polyethylene imine "Epomine SP-006" | 2.0 |
| water-soluble dye[M = Na in compound(5)] | 2.5 |
| surfactant "Olfine-E1004" (Nisshin Kagaku Kogyo K.K.) | 1.2 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |

Example 6

| Composition | Ratio(wt. %) |
|---|---|
| water | 74.5 |
| diethylene glycol | 10.0 |
| triethylene glycol butylether | 4.0 |
| polyethylene imine "Epomine SP-006" | 7.5 |
| water-soluble dye[M = Na in compound(3)] | 2.5 |
| surfactant "Olfine-E1010" (Nisshin Kagaku Kogyo K.K.) | 0.8 |
| triethanol amine | 0.2 |
| Na$_2$B$_4$O$_7$/NaOH(19/1) | 0.2 |
| tetrasodium ethylenediaminetetraacetate | 0.2 |
| antifungal:1,2-benzoisothiazoline-3-on | 0.1 |

Example 7

| Composition | Ratio(wt. %) |
|---|---|
| water | 73.1 |
| diethylene glycol | 10.0 |
| triethylene glycol butylether | 7.0 |
| polyethylene imine "Epomine SP-006" | 6.0 |
| water-soluble dye[M = Na in compound(3)] | 2.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |

Example 8

| Composition | Ratio(wt. %) |
|---|---|
| water | 81.7 |
| diethylene glycol | 10.0 |
| polyethylene imine "Epomine SP-006" | 4.5 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| Ca(OH)$_2$/NaOH(19/1) | 0.2 |
| antifungal:1,2-benzoisothiazoline-3-on | 0.1 |

Comparative Example 1

| Composition | Ratio(wt. %) |
|---|---|
| water | 72.5 |
| diethylene glycol | 10.0 |
| triethylene glycol butylether | 7.0 |
| polyethylene imine "Epomine SP-006" | 4.5 |
| acid dye C.I. 45100 | 2.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 2

| Composition | Ratio(wt. %) |
|---|---|
| water | 72.4 |
| diethylene glycol | 10.0 |
| triethylene glycol | 7.0 |
| polyethylene imine "Epomine SP-006" | 4.5 |
| direct dye C.I. Direct Red 227 | 2.6 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 3

| Composition | Ratio(wt. %) |
|---|---|
| water | 86.2 |
| diethylene glycol | 10.0 |
| water-soluble dye[M = Na in compound(3)] | 2.5 |

-continued

| Composition | Ratio(wt. %) |
|---|---|
| surfactant "polyether denaturated silicone oil TSF4452" (Toshiba Silicone Co. Ltd.) | 0.8 |
| triethanol amine | 0.2 |
| Ca(OH)$_2$/NaOH(19/1) | 0.2 |
| antifungal:1,2-benzoisothiazoline-3-on | 0.1 |

Comparative Example 4

| Composition | Ratio(wt. %) |
|---|---|
| water | 77.8 |
| diethylene glycol | 10.0 |
| polyethylene imine "Epomine SP-012" | 8.4 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| Ca(OH)$_2$/NaOH(19/1) | 0.2 |
| antifungal:1,2-benzoisothiazoline-3-on | 0.1 |

Surface tension, viscosity and pH at 25° C., stability of reservation to thermal shock, test of fungicidal property and temperature dependency of surface tension and viscosity of ink obtained from Example 1–8 and Comparative Example 1–4, and water resistance and light resistance of ink after printing were estimated. And clogging behavior at the nozzle of the ink was measured on applying the obtained ink to printing by using practical machine. The method of measuring was as follows:

1) Stability of reservation to thermal shock

The ink preserved in a polyethylene bottle at 25° C. is held at the temperature of −20° C. and 50° C. for each one hour and then is restored to 25° C. This thermal change is repeated three times a day. As this cycle was continued for one week, the thermal shock was given to the ink. Before and after this thermal shock, the viscosity (at 25° C.) was measured and the stability of reservation was ranked by means of the rate of viscosity change as follows:

○: the rate of change≦5%

Δ: the rate of change≦10%
  (practically no problem)

x: the rate of change>10%
  (impossible to use)

2) Water resistance

The ink was filled into the ink cartridge of inkjet printer MJ-500 (Epson Co.Ltd.) and printed on the SF paper (Epson Co.Ltd.). The ink was mono-color solid imaged on 5 mm square and after drying naturally for 24 hours the printed matter was immersed in pure water for 10 minutes. After taking out of water, it was dried naturally again and the rate of density change between before and after testing was measured and calculated by using Sakura Densitometer PDA65.

The criteria of evaluation by means of the rate of change is the same as 1).

3) Light resistance

The printed matter was irradiated for 200 hours under the solar lump prescribed in the ASTM D 795, and the rate of density change between before and after testing was measured.

The criteria of evaluation by means of the rate of change is the same as 1).

4) Testing of clogging of nozzle

A hundred of color charts(A4, test-chart with 20% of covered rate) having the same color as the ink were printed on the SF papers (Epson Co.Ltd.) by using practical machine in the atmosphere of high temperature and high humidity (35° C., 85%RH).

The clogging of nozzle after printing was observed by microscope. When extraneous substances adhered, the nozzle was cleaned by using rubber blade for cleaning provided in MJ-500. The estimation was conducted as follows:

○: There is no adhesion of extraneous substance around the nozzle and it can be used in the good condition.

Δ: There is some adhesion of extraneous substance around the nozzle. But the extraneous substances can be removed by cleaning and there isn't any practical problem in printing performance.

x: There are some adhered extraneous substances around the nozzle, and thinning and chipping of dots are occurring. These couldn't be restored by cleaning in some nozzle and these nozzles couldn't bear to use.

Hereupon, above ranking "Δ" where there is no practical problem is based to the estimation in binary printing used in the examples. Therefore it is possible that even if the estimation of "Δ" can be obtained, there is some practical inconvenience in the case that the smaller radii of dots are used or gradation printing is conducted using variable dot-diameters.

5) Fungicidal test

The estimation was conducted using the following fungi designated in the JIS Z 2911 (Mold-resistant test method).

Fungi strain for test

A spergillus niger IFO 4407

C haelomium globosum IFO 6347

C ladosporium cladosporioides IFO 6348

P enicillium citrinum IFO 7784

R hizopus siolonifer IFO 5411

The preparation of cystoid spore suspension

After each fungi strain for test was cultivated at 25° C. for 10 days on agar culture medium of potato dextrose[Eiken Kagaku Co. Ltd.], the each spore (conidium) was floated on the 0.005% solution of sterilized sulfosuccinic acid dioctyl-sodium and each suspension of single spore was prepared.

The same amount from each suspension of single spore was mixed and mixed suspension of spores was prepared.

Testing manipulation 2 ml of each ink were put into plastic shale and 0.2 ml of mixed suspension of spore were inoculated on them. With covering up, the ink was preserved at temperature of 28°±2° C. and about 97% RH. After 4 weeks of cultivating the state of growth of hyphae in specimen was observed by eyes and microscope.

○: no developement of fungi

Δ: area of fungi developement was less than ⅓ part of total area. This means that there is no change for 2 years in cartridge, therefore there is practically no problem.

x: area of fungi developement was ⅓ part or more of total area. It means they are impossible to use practically.

Results are shown in Table 1 and Table 2.

TABLE 1

| | Example | | | | | | | |
|---|---|---|---|---|---|---|---|---|
| | 1 | 2 | 3 | 4 | 5 | 6 | 7 | 8 |
| surface tension (dyne/cm; 25° C.) | 30.5 | 35.2 | 29.8 | 35.0 | 43.6 | 36.4 | 34.0 | 48.5 |
| viscosity (cp; 25° C.) | 2.7 | 2.3 | 2.6 | 3.0 | 1.9 | 2.3 | 2.1 | 1.8 |
| pH (25° C.) | 8.4 | 8.1 | 8.3 | 8.7 | 7.8 | 8.2 | 7.7 | 7.6 |
| stability of reservation | ○ | ○ | ○ | ○ | ○ | ○ | ○ | Δ |
| water resistance | ○ | ○ | ○ | ○ | ○ | ○ | ○ | ○ |
| light resistance | ○ | ○ | ○ | ○ | ○ | ○ | ○ | Δ |
| test for nozzle clogging | ○ | ○ | ○ | ○ | ○ | ○ | ○ | Δ |
| test for fungicidal property | ○ | ○ | ○ | ○ | ○ | ○ | ○ | Δ |

TABLE 2

| | Comparative Example | | | |
|---|---|---|---|---|
| | 1 | 2 | 3 | 4 |
| surface tension (dyne/cm; 25° C.) | 32.1 | 32.0 | 42.3 | 38.2 |
| viscosity (cp; 25° C.) | 2.8 | 2.7 | 1.6 | 2.0 |
| pH (25° C.) | 8.5 | 8.5 | 7.4 | 8.1 |
| stability of reservation | o | o | x | x |
| water resistance | x | x | o | o |
| light resistance | Δ | Δ | o | o |
| test for nozzle clogging | o | o | Δ | Δ |
| test for fungicidal property | o | o | x | o |

Example 9

| Composition | Ratio(wt. %) |
|---|---|
| water | 71.9 |
| diethylene glycol | 12.0 |
| triethylene glycol | 4.0 |
| polyethylene glycol (#400; molecular weight ca.400) | 6.0 |
| water-soluble dye [M = Na in compound (3)] | 2.6 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Example 10

| Composition | Ratio(wt. %) |
|---|---|
| water | 75.6 |
| diethylene glycol | 10.0 |
| triethylene glycol butylether | 7.0 |
| polyethylene glycol (#300; molecular weight ca.300) | 4.5 |
| water-soluble dye [M = Na in compound (3)] | 1.5 |
| surfactant "Olfine-E1010" (Nisshin Kagaku Kogyo K.K.) | 0.8 |
| triethanol amine | 0.2 |
| NaHCO$_3$/NaOH(19/1) | 0.1 |
| tetrasodium ethylenediaminetetraacetate | 0.2 |
| antifungal:1,2-benzoisothiazoline-3-on | 0.1 |

Example 11

| Composition | Ratio(wt. %) |
|---|---|
| water | 72.0 |
| diethylene glycol | 12.0 |
| triethylene glycol butylether | 6.5 |
| polyethylene glycol (#400) | 4.0 |
| water-soluble dye [M = Na in compound (3)] | 2.5 |
| surfactant "Olfine-E1010" (Nisshin Kagaku Kogyo K.K.) | 1.5 |
| triethanol amine | 0.2 |
| Na$_2$B$_4$O$_7$/NaOH(19/1) | 0.1 |
| tetrasodium ethylenediaminetetraacetate | 0.2 |
| antifungal:1,2-benzoisothiazoline-3-on | 0.1 |

Example 12

| Composition | Ratio(wt. %) |
|---|---|
| water | 72.5 |
| diethylene glycol | 10.0 |
| triethylene glycol butylether | 7.0 |
| polyethylene glycol (#400) | 4.5 |
| water-soluble dye [M = Na in compound (3)] | 4.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |

Example 13

| Composition | Ratio(wt. %) |
|---|---|
| water | 73.1 |
| diethylene glycol | 10.0 |
| triethylene glycol | 7.0 |
| polyethylene glycol (#300) | 4.5 |
| water-soluble dye [M = Na in compound (5)] | 2.5 |
| surfactant "Olfine-E1004" (Nisshin Kagaku Kogyo K.K.) | 1.2 |

-continued

| Composition | Ratio(wt. %) |
|---|---|
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| isopropylalcohol | 1.0 |

Example 14

| Composition | Ratio(wt. %) |
|---|---|
| water | 72.8 |
| diethylene glycol | 10.0 |
| triethylene glycol butylether | 7.0 |
| polyethylene glycol (#300) | 4.2 |
| water-soluble dye [M = Na in compound (3)] | 2.5 |
| surfactant "Olfine-E1010" (Nisshin Kagaku Kogyo K.K.) | 0.8 |
| triethanol amine | 0.2 |
| Na$_2$B$_4$O$_7$/NaOH(19/1) | 0.2 |
| tetrasodium ethylenediaminetetraacetate | 0.2 |
| antifungal:1,2-benzoisothiazoline-3-on | 0.1 |
| ethanol | 1.0 |
| isopropylalcohol | 1.0 |

Example 15

| Composition | Ratio(wt. %) |
|---|---|
| water | 81.5 |
| diethylene glycol | 10.0 |
| polyethylene glycol (#400) | 4.5 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| NaHCO$_3$/NaOH(19/1) | 0.2 |
| sodium gluconate | 0.2 |
| antifungal:1,2-benzoisothiazoline-3-on | 0.1 |

Comparative Example 5

| Composition | Ratio(wt. %) |
|---|---|
| water | 72.5 |
| diethylene glycol | 10.0 |
| triethylene glycol butylether | 7.0 |
| polyethylene glycol (#400) | 4.5 |
| acid dye C.I. 45100 | 2.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 6

| Composition | Ratio(wt. %) |
|---|---|
| water | 72.4 |
| diethylene glycol | 10.0 |
| triethylene glycol | 7.0 |
| polyethylene glycol (#400) | 4.5 |
| direct dye C.I. Direct Red 227 | 2.6 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 7

| Composition | Ratio(wt. %) |
|---|---|
| water | 74.7 |
| diethylene glycol | 10.0 |
| triethylene glycol butylether | 7.0 |
| polyethylene glycol (#400) | 4.5 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| sodium gluconate | 0.2 |
| antifungal:1,2-benzoisothiazoline-3-on | 0.1 |

Comparative Example 8

| Composition | Ratio(wt. %) |
|---|---|
| water | 71.5 |
| diethylene glycol | 10.0 |
| triethylene glycol butylether | 7.0 |
| polyethylene glycol (#400) | 4.5 |
| water-soluble dye [M = Na in compound(3)] | 2.5 |
| surfactant "polyether denaturated silicone oil TSF4452" (Toshiba Silicone Co. Ltd.) | 0.8 |
| triethanol amine | 0.2 |
| NaHCO$_3$/NaOH(19/1) | 3.0 |
| sodium gluconate | 0.2 |
| antifungal:1,2-benzoisothiazoline-3-on | 0.3 |

The surface tension, viscosity and pH at 25° C., stability of reservation to thermal shock about the inks obtained in Examples 9–15 and Comparative Examples 5–8, and water resistance and light resistance of the inks after printing were measured in the same way of Example 1. And the fluctuation of dot radii of above each ink was also measured. The method of the measurement is as follows:

6) fluctuation of dot-diameter

The ink was filled into the ink cartridge of inkjet printer MJ-500 (Epson Co.Ltd.) and printed by 100 dots on the SF paper (Epson Co.Ltd.). The printed dot-diameter were measured by image treating apparatus "Lusex 5000X system" (Nileco Company) and the fluctuation was estimated. The measurement was conducted at 25° C., 65%RH.

The performance of ink was ranked as follows according to the rate of change of dot-diameter:

○: the rate of change of dot-diameter≦5%

Δ: the rate of change of dot-diameter≦10% (practically no problem)

x: the rate of change of dot-diameter>10% (impossible to use)

Hereupon, above ranking "Δ" where there is no practical problem is based to the estimation in binary printing used in the examples. Therefore it is possible that even if the estimation of "Δ" can be obtained, there is some practical inconvenience in the case that the smaller dot-diameters are used or gradation printing is conducted using variable dot-diameters.

The results were shown in Table 3 and Table 4.

TABLE 3

|  | Example | | | | | | |
|---|---|---|---|---|---|---|---|
|  | 9 | 10 | 11 | 12 | 13 | 14 | 15 |
| surface tension (dyne/cm; 25° C.) | 35.5 | 49.5 | 29.6 | 36.0 | 31.3 | 36.8 | 39.0 |
| viscosity (cp;25° C.) | 2.3 | 2.6 | 3.8 | 2.1 | 2.2 | 2.2 | 1.9 |
| pH (25° C.) | 8.4 | 7.6 | 9.4 | 8.4 | 8.5 | 8.6 | 7.2 |
| stability of reservation | o | o | o | o | o | o | Δ |
| water resistance | o | o | o | o | o | o | o |
| light resistance | o | o | o | o | o | o | o |
| fluctuation of dot-diameter | o | o | o | o | o | o | Δ |

TABLE 4

|  | Comparative Example | | | |
|---|---|---|---|---|
|  | 5 | 6 | 7 | 8 |
| surface tension (dyne/cm; 25° C.) | 31.4 | 31.4 | 34.7 | 29.7 |
| viscosity (cp;25° C.) | 2.9 | 2.8 | 2.6 | 3.1 |
| pH (25° C.) | 8.6 | 8.3 | 8.2 | 11.2 |
| stability of reservation | o | o | x | Δ |
| water resistance | x | x | o | o |
| light resistance | Δ | Δ | o | o |
| fluctuation of dot-diameter | o | o | x | x |

Example 16

| Composition | Ratio(wt. %) |
|---|---|
| water | 70.9 |
| diethylene glycol | 10.0 |
| triethylene glycol | 7.0 |
| polyethylene glycol (#400) | 6.0 |
| water-soluble dye [M = Na in compound (3)] | 2.6 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Example 17

| Composition | Ratio(wt. %) |
|---|---|
| water | 75.65 |
| diethylene glycol | 10.0 |
| triethylene glycol butylether | 7.0 |
| polyethylene glycol (#300) | 4.5 |
| water-soluble dye [M = Na in compound (3)] | 1.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.05 |
| antifungal:1,2-benzoisothiazoline-3-on | 0.1 |

Example 18

| Composition | Ratio(wt. %) |
|---|---|
| water | 72.0 |
| diethylene glycol | 10.0 |
| triethylene glycol butylether | 7.0 |
| polyethylene glycol (#400) | 4.0 |
| water-soluble dye [M = Na in compound (3)] | 2.5 |
| surfactant "Olfine-E1010" (Nisshin Kagaku Kogyo K.K.) | 0.8 |
| triethanol amine | 0.2 |
| Na$_2$B$_4$O$_7$/NaOH(19/1) | 0.2 |
| tetrasodium ethylenediaminetetraacetate | 1.7 |
| antifungal:1,2-benzoisothiazoline-3-on | 0.1 |
| ethanol | 1.5 |

Example 19

| Composition | Ratio(wt. %) |
|---|---|
| water | 71.5 |
| diethylene glycol | 10.0 |
| triethylene glycol butylether | 7.0 |
| polyethylene glycol (#400) | 4.5 |
| water-soluble dye [M = Na in compound (3)] | 4.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| isopropyl alcohol | 1.0 |

Example 20

| Composition | Ratio(wt. %) |
|---|---|
| water | 75.6 |
| diethylene glycol | 10.0 |
| triethylene glycol | 4.0 |
| polyethylene glycol (#400) | 6.0 |
| water-soluble dye [M = Na in compound (5)] | 2.5 |
| surfactant "Olfine-E1010" (Nisshin Kagaku Kogyo K.K.) | 1.2 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |

Example 21

| Composition | Ratio(wt. %) |
| --- | --- |
| water | 74.0 |
| diethylene glycol | 10.0 |
| triethylene glycol butylether | 4.0 |
| polyethylene glycol (#400) | 8.0 |
| water-soluble dye [M = Na in compound (3)] | 2.5 |
| surfactant "Olfine-E1010" (Nisshin Kagaku Kogyo K.K.) | 0.8 |
| triethanol amine | 0.2 |
| $Na_2B_4O_7$/NaOH(19/1) | 0.2 |
| tetrasodium ethylenediaminetetraacetate | 0.2 |
| antifungal:1,2-benzoisothiazoline-3-on | 0.1 |

Example 22

| Composition | Ratio(wt. %) |
| --- | --- |
| water | 81.7 |
| diethylene glycol | 10.0 |
| polyethylene glycol (#400) | 4.5 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| tetrasodium ethylenediaminetetraacetate | 0.2 |
| antifungal:1,2-benzoisothiazoline-3-on | 0.1 |

Comparative Example 9

| Composition | Ratio(wt. %) |
| --- | --- |
| water | 72.5 |
| diethylene glycol | 10.0 |
| triethylene glycol butylether | 7.0 |
| polyethylene glycol (#400) | 4.5 |
| acid dye C.I. 45100 | 2.5 |
| surfactant "Olfine-E1010" (Nisshin Kagaku Kogyo K.K.) | 0.8 |
| triethanol amine | 0.2 |
| $NaHCO_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 10

| Composition | Ratio(wt. %) |
| --- | --- |
| water | 72.4 |
| diethylene glycol | 10.0 |
| triethylene glycol | 7.0 |
| polyethylene glycol (#400) | 4.5 |
| direct dye C.I. Direct Red 227 | 2.6 |
| surfactant "Olfine-E1010" (Nisshin Kagaku Kogyo K.K.) | 0.8 |
| triethanol amine | 0.2 |
| $NaHCO_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 11

| Composition | Ratio(wt. %) |
| --- | --- |
| water | 81.9 |
| diethylene glycol | 10.0 |
| polyethylene glycol (#400) | 4.5 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| antifungal:1,2-benzoisothiazoline-3-on | 0.1 |

Comparative Example 12

| Composition | Ratio(wt. %) |
| --- | --- |
| water | 79.7 |
| diethylene glycol | 10.0 |
| polyethylene glycol (#400) | 4.5 |
| water-soluble dye[M = Na in compound(3)] | 2.5 |
| surfactant "polyether denaturated silicone oil TSF4452" (Toshiba Silicone Co. Ltd.) | 0.8 |
| triethanol amine | 0.2 |
| tetrasodium ethylenediaminetetraacetate | 2.2 |
| antifungal:1,2-benzoisothiazoline-3-on | 0.1 |

The surface tension, viscosity and pH at 25° C., the clogging property at the jetting part of nozzle of the inks obtained in Examples 16–22 and Comparative Examples 9–12, and water resistance and light resistance of the inks after printing were measured in the same way of Example 1. And the stability of reservation of above each ink to the change of environmental condition was also measured. The method of the measurement is as follows:

7) The stability of reservation to the change of environmental condition

The ink was filled into head of the ink cartridge of inkjet printer MJ-500 (Epson Co.Ltd.) and was retained for 100 hours in the testing room for environment kept at the condition of 35° C., 20%RH. After that, the change in the state of ink was estimated by eyes, and the performance of ink was ranked according to the following criteria.

◯: no change

Δ: some deposition of extraneous substance (it can return to normally by maintenance action of printer)

x: some existence of extraneous substance after maintenance.

Hereupon, ranking "Δ" where there is no practical problem in the above each testing item is based to the estimation in binary printing used in the examples. Therefore it is possible that even if the estimation of "Δ" can be obtained, there is some practical inconvenience in the case that the smaller dot-diameters are used or gradation printing is conducted using variable dot-diameters.

The results were shown in Table 5 and Table 6.

TABLE 5

| | Example | | | | | | |
| --- | --- | --- | --- | --- | --- | --- | --- |
| | 16 | 17 | 18 | 19 | 20 | 21 | 22 |
| surface tension (dyne/cm; 25° C.) | 30.5 | 35.7 | 29.8 | 35.0 | 34.3 | 36.8 | 42.2 |

TABLE 5-continued

| | Example | | | | | | |
|---|---|---|---|---|---|---|---|
| | 16 | 17 | 18 | 19 | 20 | 21 | 22 |
| viscosity (cp;25° C.) | 2.3 | 2.0 | 3.6 | 2.1 | 2.4 | 3.0 | 1.8 |
| pH (25° C.) | 8.5 | 8.1 | 8.6 | 8.0 | 8.5 | 8.6 | 7.4 |
| stability of reservation | o | o | o | o | o | o | Δ |
| water resistance | o | o | o | o | o | o | o |
| light resistance | o | o | o | o | o | o | o |
| test for nozzle clogging | o | o | o | o | o | o | Δ |

TABLE 6

| | Comparative Example | | | |
|---|---|---|---|---|
| | 9 | 10 | 11 | 12 |
| surface tension (dyne/cm; 25° C.) | 31.4 | 31.4 | 42.5 | 39.4 |
| viscosity (cp;25° C.) | 2.9 | 2.8 | 1.8 | 2.1 |
| pH (25° C.) | 8.6 | 8.3 | 8.3 | 8.1 |
| stability of reservation | o | o | x | x |
| water resistance | x | x | o | o |
| light resistance | Δ | Δ | o | o |
| test for nozzle clogging | o | o | x | x |

Example 23

| Composition | Ratio(wt. %) |
|---|---|
| water | 78.4 |
| diethylene glycol | 9.5 |
| polyethylene glycol (#400) | 6.0 |
| water-soluble dye [M = Na in compound (3)] | 2.6 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Example 24

| Composition | Ratio(wt. %) |
|---|---|
| water | 81.2 |
| diethylene glycol | 6.0 |
| triethylene glycol butylether | 6.0 |
| polyethylene glycol (#300) | 4.5 |
| water-soluble dye [M = Na in compound (3)] | 1.5 |
| surfactant "Olfine-E1010" (Nisshin Kagaku Kogyo K.K.) | 0.1 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |

Example 25

| Composition | Ratio(wt. %) |
|---|---|
| water | 73.35 |
| diethylene glycol | 6.5 |
| triethylene glycol butylether | 6.5 |
| polyethylene glycol (#400) | 4.0 |
| water-soluble dye [M = Na in compound (3)] | 2.5 |
| surfactant "Olfine-E1010" (Nisshin Kagaku Kogyo K.K.) | 4.5 |
| triethanol amine | 0.2 |
| Na$_2$B$_4$O$_7$/NaOH(19/1) | 0.2 |
| tetrasodium ethylenediaminetetraacetate | 0.2 |
| antifungal:1,2-benzoisothiazoline-3-on | 0.1 |

Example 26

| Composition | Ratio(wt. %) |
|---|---|
| water | 71.5 |
| diethylene glycol | 10.0 |
| triethylene glycol butylether | 7.0 |
| polyethylene glycol (#400) | 4.5 |
| water-soluble dye [M = Na in compound (3)] | 2.6 |
| surfactant "Olfine-E1010" (Nisshin Kagaku Kogyo K.K.) | 1.8 |
| triethanol amine | 1.0 |
| NaHCO$_3$/NaOH(19/1) | 0.2 |
| tetrasodium ethylenediaminetetraacetate | 1.3 |
| antifungal:1,2-benzoisothiazoline-3-on | 0.1 |

Example 27

| Composition | Ratio(wt. %) |
|---|---|
| water | 77.6 |
| diethylene glycol | 12.0 |
| polyethylene glycol (#300) | 4.5 |
| water-soluble dye [M = Na in compound (3)] | 2.5 |
| surfactant "Olfine-E1010" (Nisshin Kagaku Kogyo K.K.) | 1.2 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| isopropyl alcohol | 1.5 |

Example 28

| Composition | Ratio(wt. %) |
|---|---|
| water | 81.7 |
| triethylene glycol butylether | 6.5 |
| polyethylene glycol (#200) | 4.2 |
| water-soluble dye [M = Na in compound (3)] | 4.5 |
| surfactant "Olfine-E1010" (Nisshin Kagaku Kogyo K.K.) | 0.8 |
| triethanol amine | 0.2 |
| Na$_2$B$_4$O$_7$/NaOH(19/1) | 0.2 |

-continued

| Composition | Ratio(wt. %) |
|---|---|
| tetrasodium ethylenediaminetetraacetate | 0.2 |
| antifungal:1,2-benzoisothiazoline-3-on | 0.1 |
| ethanol | 0.8 |
| isopropylalcohol | 0.8 |

Example 29

| Composition | Ratio(wt. %) |
|---|---|
| water | 81.7 |
| diethylene glycol | 10.0 |
| polyethylene glycol (#400) | 4.5 |
| water-soluble dye [M = Na in compound (3)] | 2.5 |
| surfactant "Olfine-E1010" (Nisshin Kagaku Kogyo K.K.) | 0.8 |
| triethanol amine | 0.2 |
| Ca(OH)$_2$/NaOH(19/1) | 0.2 |
| antifungal:1,2-benzoisothiazoline-3-on | 0.1 |

Comparative Example 13

| Composition | Ratio(wt. %) |
|---|---|
| water | 72.5 |
| diethylene glycol | 10.0 |
| triethylene glycol butylether | 7.0 |
| polyethylene glycol (#400) | 4.5 |
| acid dye C.I. 45100 | 2.5 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 14

| Composition | Ratio(wt. %) |
|---|---|
| water | 72.4 |
| diethylene glycol | 10.0 |
| triethylene glycol | 7.0 |
| polyethylene glycol (#400) | 4.5 |
| direct dye C.I. Direct Red 227 | 2.6 |
| surfactant "Olfine-E1010" (Nisshin Kagaku Kogyo K.K.) | 0.8 |
| triethanol amine | 0.2 |
| NaHCO$_3$/NaOH(19/1) | 0.2 |
| tetrasodium ethylenediaminetetraacetate | 0.2 |
| antifungal:1,2-benzoisothiazoline-3-on | 0.1 |
| ethanol | 2.0 |

Comparative Example 15

| Composition | Ratio(wt. %) |
|---|---|
| water | 82.7 |
| diethylene glycol | 10.0 |
| polyethylene glycol (#400) | 4.5 |
| water-soluble dye [M = Na in compound (3)] | 2.5 |
| Ca(OH)$_2$/NaOH(19/1) | 0.2 |
| antifungal:1,2-benzoisothiazoline-3-on | 0.1 |

Comparative Example 16

| Composition | Ratio(wt. %) |
|---|---|
| water | 77.0 |
| diethylene glycol | 10.0 |
| polyethylene glycol (#400) | 4.5 |
| water-soluble dye[M = Na in compound(3)] | 2.5 |
| surfactant "polyether denaturated silicone oil TSF4452" (Toshiba Silicone Co. Ltd.) | 5.5 |
| triethanol amine | 0.2 |
| Ca(OH)$_2$/NaOH(19/1) | 0.2 |
| antifungal:1,2-benzoisothiazoline-3-on | 0.1 |

The surface tension, viscosity and pH at 25° C., stability of reservation to thermal shock about the inks obtained in Examples 23–29 and Comparative Examples 13–16, and water resistance and light resistance of the inks after printing were measured in the same way of Example 1. And the temperature dependency of surface tension and viscosity about each ink was also measured. The method of the measurement is as follows:

8) Temperature dependency of surface tension and viscosity

The change of surface tension and viscosity of ink was measured when the temperature of ink changed from 5° C. to 35° C. The temperature dependency of ink was ranked as follows according to the rate of change of surface tension and viscosity:

○: the rate of change ≦ 5%

Δ: the rate of change ≦ 10%
(practically no problem)

×: the rate of change > 10%
(impossible to use)

Hereupon, above ranking "Δ" where there is no practical problem is based to the estimation in binary printing used in the examples. Therefore it is possible that even if the estimation of "Δ" can be obtained, there is some practical inconvenience in the case that the smaller dot-diameters are used or gradation printing is conducted using variable dot-diameters.

The results were shown in Table 7 and Table 8.

TABLE 7

| | Example | | | | | | |
|---|---|---|---|---|---|---|---|
| | 23 | 24 | 25 | 26 | 27 | 28 | 29 |
| surface tension (dyne/cm; 25° C.) | 35.5 | 49.5 | 29.6 | 36.0 | 31.3 | 36.8 | 39.5 |
| viscosity (cp;25° C.) | 2.3 | 2.6 | 3.8 | 2.1 | 2.2 | 2.2 | 1.8 |
| pH (25° C.) | 8.4 | 7.6 | 9.3 | 8.4 | 8.5 | 8.6 | 7.8 |
| stability of reservation | ○ | ○ | ○ | ○ | ○ | ○ | Δ |
| water resistance | ○ | ○ | ○ | ○ | ○ | ○ | ○ |
| light resistance | ○ | ○ | ○ | ○ | ○ | ○ | ○ |
| temp. * | ○ | ○ | Δ | ○ | ○ | ○ | ○ |
| depend ** -ency | ○ | ○ | ○ | ○ | ○ | ○ | ○ |

*:surface tension,
**:viscosity

TABLE 8

| | Comparative Example | | | |
|---|---|---|---|---|
| | 13 | 14 | 15 | 16 |
| surface tension (dyne/cm; 25° C.) | 31.4 | 31.4 | 42.7 | 35.5 |
| viscosity (cp;25° C.) | 2.9 | 2.8 | 1.6 | 2.4 |
| pH (25° C.) | 8.6 | 8.3 | 7.2 | 8.5 |
| stability of reservation | o | o | x | x |
| water resistance | x | x | o | o |
| light resistance | Δ | Δ | o | Δ |
| temp. * depend-ency | o | o | x | o |
| ** | o | o | x | Δ |

*:surface tension,
**:viscosity

What is claimed is:

1. Ink for ink-jetting, comprising 0.1–5 wt % of water-soluble dye represented by general formula (A):

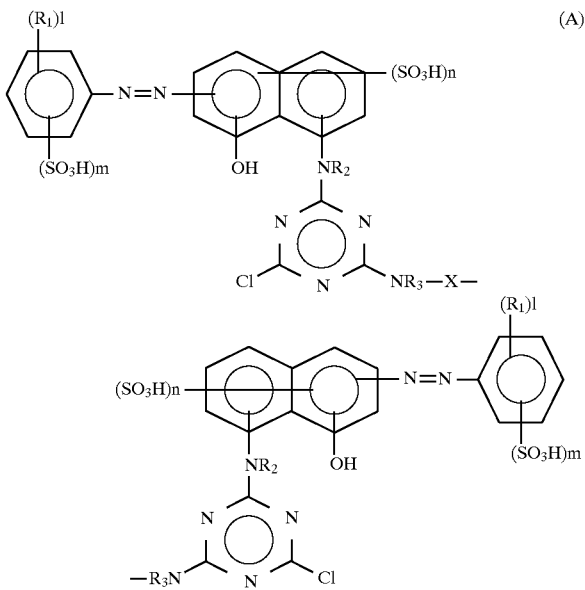

wherein R$_1$, R$_2$ and R$_3$ are hydrogen atom or alkyl group, X represents substituted or unsubstituted phenylene group, substituted or unsubstituted diphenylene group, substituted or unsubstituted naphthylene group or —NR$_3$—X—R$_3$N— represents 1,4-pyperazinylene group, M is alkaline metal, quaternary ammonium or hydrogen atom, n is an integer of 1 to 5, m is an integer of 1 to 5 and "l" is 5–m;
2–8 wt % of polyethylene imine; and water.

2. Ink for ink-jetting of claim 1 wherein the molecular weight of polyethylene imine is 200–10000.

3. Ink for ink-jetting of claim 1 which further comprises 1–20 wt % of polyvalent alcohol having three hydroxyl groups in terms of total weight of ink.

4. Ink for ink-jetting of claim 1 which further comprises 1–30 wt % of lower alkylether of alkylene glycol in terms of total weight of ink.

5. Ink for ink-jetting of claim 1 which further comprises 1–30 wt % of alkylene glycol represented by formula (C):

$$HO(C_xH_{2x}O)_yH \quad (C)$$

wherein x and y are the integer of $2 \leq x$ and $2 \leq xxy \leq 6$, in terms of total weight of ink.

6. Ink for ink-jetting of claim 1 which further comprises the polyethylene imine, a lower alkyl ether of alkylene glycol and at least one alcohol compound selected from the group consisting of an alkylene glycol and a polyvalent alcohol having three hydroxyl groups, said alkylene glycol represented by the formula (C):

$$HO(C_xH_{2x}O)_yH \quad (C)$$

wherein x and y are the integer of $2 \leq x$ and $2 \leq xxy \leq 6$, a total amount of the polyethylene imine, the lower alkyl ether of alkylene glycol and the alcohol compound being within the range between 10 and 30% by weight, based on total weight of the ink.

7. Ink for ink-jetting of claim 1 which further comprises 0.1–15 wt % of an aliphatic alcohol in terms of total weight of ink.

8. Ink for ink-jetting of claim 7, wherein the aliphatic alcohol has an alkyl group with 1 to 5 carbon atoms.

9. Ink for ink-jetting of claim 1 which further comprises 0.01 to 5 wt % of amphiphilic substances in terms of total weight of ink.

10. Ink for ink-jetting of claim 9, wherein said amphiphilic substance is at least one compound selected from the group consisting of ureas, amides, cyclic amides and alkanol amines.

11. Ink for ink-jetting, comprising 0.1 to 5 wt % of water-soluble dye represented by general formula (A):

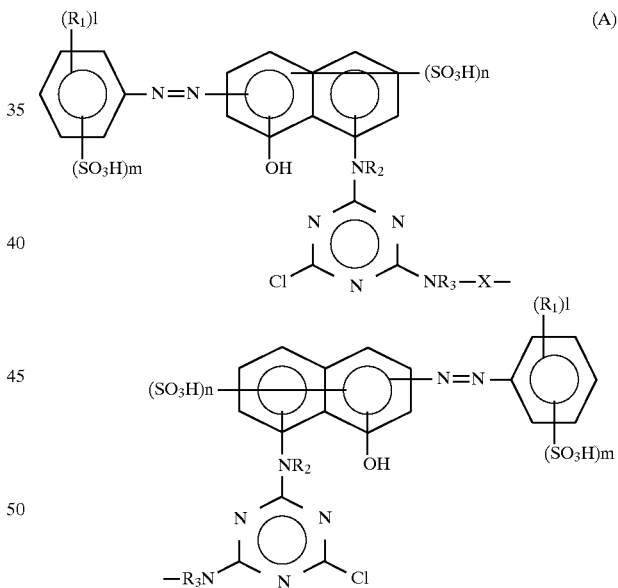

wherein R$_1$, R$_2$ and R$_3$ are hydrogen atom or alkyl group, X represents substituted or unsubstituted phenylene group, substituted or unsubstituted diphenylene group, substituted or unsubstituted naphthylene group or —NR$_3$—X—R$_3$N— represents 1,4-pyperazinylene group, M is alkaline metal, quaternary ammonium or hydrogen atom, n is an integer of 1 to 5, m is an integer of 1 to 5 and "l" is 5–m;
0.01–2 wt % of the mixture of NaOH and at least one compound selected from the group consisting of NaHCO$_3$ and Na$_2$B$_4$O$_7$; and water.

12. Ink for ink-jetting of claim 11 which further comprises 1–20 wt % of polyvalent alcohol having three hydroxyl groups in terms of total weight of ink.

13. Ink for ink-jetting of claim 11 which further comprises 1–30 wt % of lower alkylether of alkylene glycol in terms of total weight of ink.

14. Ink for ink-jetting of claim 11 which further comprises 1–30 wt % of alkylene glycol represented by formula (C):

wherein x and y are the integer of $2 \leq x$ and $2 \leq xxy \leq 6$, in terms of total weight of ink.

15. Ink for ink-jetting of claim 11 which further comprises polyalkylene glycol having molecular weight of more than 150.

16. Ink for ink-jetting of claim 11 which further comprises a polyalkylene glycol, a lower alkyl ether of alkylene glycol and at least one alcohol compound selected from the group consisting of an alkylene glycol and a polyvalent alcohol having three hydroxyl groups, said alkylene glycol represented by the formula (C):

wherein x and y are the integer of $2 \leq x$ and $2 \leq xxy \leq 6$, a total amount of the polyalkylene glycol, the lower alkyl ether of alkylene glycol and the alcohol compound being within the range between 10 and 30% by weight, based on total weight of the ink.

17. Ink for ink-jetting of claim 11 which further comprises 0.1–15 wt % of an aliphatic alcohol in terms of total weight of ink.

18. Ink for ink-jetting of claim 17, wherein the aliphatic alcohol has an alkyl group with 1 to 5 carbon atoms.

19. Ink for ink-jetting of claim 11 which further comprises 0.01 to 5 wt % of amphiphilic substances in terms of total weight of ink.

20. Ink for ink-jetting of claim 19, wherein said amphiphilic substance is at least one compound selected from the group consisting of ureas, amides, cyclic amides and alkanol amines.

21. Ink for ink-jetting, comprising 0.1 to 5 wt % of water-soluble dye represented by general formula (A):

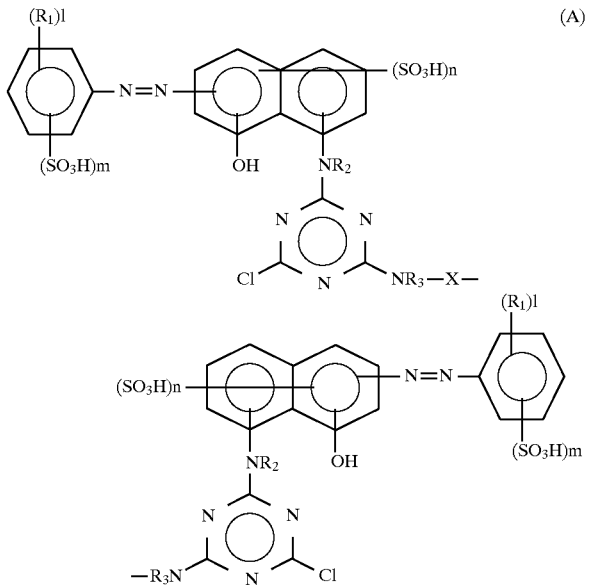

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or $-NR_3-X-R_3N-$ represents 1,4-pyperazinylene group, M is alkaline metal, quaternary ammonium or hydrogen atom, n is an integer of 1 to 5, m is an integer of 1 to 5 and "l" is 5–m; 0.01–2 wt % of alkaline metal salts of ethylenediaminetetraacetic acid; and water.

22. Ink for ink-jetting of claim 21 which further comprises 1–20 wt % of polyvalent alcohol having three hydroxyl groups in terms of total weight of ink.

23. Ink for ink-jetting of claim 21 which further comprises 1–30 wt % of lower alkylether of alkylene glycol in terms of total weight of ink.

24. Ink for ink-jetting of claim 21 which further comprises 1–30 wt % of alkylene glycol represented by formula (C):

wherein x and y are the integer of $2 \leq x$ and $2 \leq xxy \leq 6$, in terms of total weight of ink.

25. Ink for ink-jetting of claim 21 which further comprises polyalkylene glycol having molecular weight of more than 150.

26. Ink for ink-jetting of claim 21 which further comprises a polyalkylene glycol, a lower alkyl ether of alkylene glycol and at least one alcohol compound selected from the group consisting of an alkylene glycol and a polyvalent alcohol having three hydroxyl groups, said alkylene glycol represented by the formula (C):

wherein x and y are the integer of $2 \leq x$ and $2 \leq xxy \leq 6$, a total amount of the polyalkylene glycol, the lower alkyl ether of alkylene glycol and the alcohol compound being within the range between 10 and 30% by weight, based on total weight of the ink.

27. Ink for ink-jetting of claim 21 which further comprises 0.1–15 wt % of an aliphatic alcohol in terms of total weight of ink.

28. Ink for ink-jetting of claim 27, wherein the aliphatic alcohol has an alkyl group with 1 to 5 carbon atoms.

29. Ink for ink-jetting of claim 21 which further comprises 0.01 to 5 wt % of amphiphilic substances in terms of total weight of ink.

30. Ink for ink-jetting of claim 29, wherein said amphiphilic substance is at least one compound selected from the group consisting of ureas, amides, cyclic amides and alkanol amines.

31. Ink for ink-jetting, comprising 0.1 to 5 wt % of water-soluble dye represented by general formula (A):

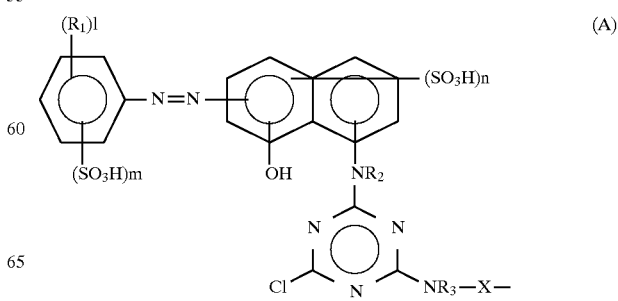

-continued

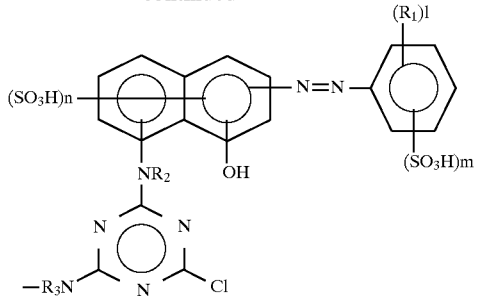

wherein $R_1$, $R_2$ and $R_3$ are hydrogen atom or alkyl group, X represents substituted or unsubstituted phenylene group, substituted or unsubstituted diphenylene group, substituted or unsubstituted naphthylene group or $-NR_3-X-R_3N-$ represents 1,4-pyperazinylene group, M is alkaline metal, quaternary ammonium or hydrogen atom, n is an integer of 1 to 5, m is an integer of 1 to 5 and "l" is 5–m;
0.01 to 5 wt % of alkylene oxide addition products of acetylene glycol represented by general formula (B):

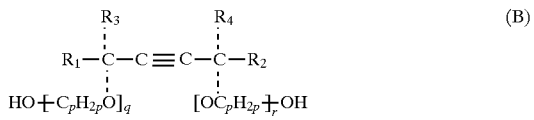

wherein $R_1$, $R_2$, $R_3$ and $R_4$ is alkyl group having 1 to 5 carbon atoms, p is an integer of 2 or 3, q and r each is an integer of more than 1; and water.

32. Ink for ink-jetting of claim 31 which further comprises 1–20 wt % of polyvalent alcohol having three hydroxyl groups in terms of total weight of ink.

33. Ink for ink-jetting of claim 31 which further comprises 1–30 wt % of lower alkylether of alkylene glycol in terms of total weight of ink.

34. Ink for ink-jetting of claim 31 which further comprises 1–30 wt % of alkylene glycol represented by formula (C):

$$HO(C_xH_{2x}O)_yH \qquad (C)$$

wherein x and y are the integer of $2 \leqq x$ and $2 \leqq xxy \leqq 6$, in terms of total weight of ink.

35. Ink for ink-jetting of claim 31 which further comprises polyalkylene glycol having molecular weight of more than 150.

36. Ink for ink-jetting of claim 31 which further comprises a polyalkylene glycol, a lower alkyl ether of alkylene glycol and at least one alcohol compound selected from the group consisting of an alkylene glycol and a polyvalent alcohol having three hydroxyl groups, said alkylene glycol represented by the formula (C):

$$HO(C_xH_{2x}O)_yH \qquad (C)$$

wherein x and y are the integer of $2 \leqq x$ and $2 \leqq xxy \leqq 6$, a total amount of the polyalkylene glycol, the lower alkyl ether of alkylene glycol and the alcohol compound being within the range between 10 and 30% by weight, based on total weight of the ink.

37. Ink for ink-jetting of claim 31 which further comprises 0.1–15 wt % of an aliphatic alcohol in terms of total weight of ink.

38. Ink for ink-jetting of claim 37, wherein the aliphatic alcohol has an alkyl group with 1 to 5 carbon atoms.

39. Ink for ink-jetting of claim 31 which further comprises 0.01 to 5 wt % of amphiphilic substances in terms of total weight of ink.

40. Ink for ink-jetting of claim 39, wherein said amphiphilic substance is at least one compound selected from the group consisting of ureas, amides, cyclic amides and alkanol amines.

41. Ink for ink-jetting of claim 31 which further comprises 2–8 wt % of polyethylene imine in terms of total weight of ink.

42. Ink for ink-jetting of claim 31 which further comprises 0.01–2 wt % of the mixture of NaOH and at least one compound selected from the group consisting of $NaHCO_3$ and $Na_2B_4O_7$.

43. Ink for ink-jetting of claim 31 which further comprises 0.01–2 wt % of alkaline metal salts of ethylenediaminetetraacetic acid.

* * * * *

UNITED STATES PATENT AND TRADEMARK OFFICE
CERTIFICATE OF CORRECTION

PATENT NO. : 5,843,217
DATED : December 1, 1998
INVENTOR(S) : Ueda et al.

It is certified that error appears in the above-identified patent and that said Letters Patent is hereby corrected as shown below:

In the Claims:

Claim 5, line 3, change "$2 \leq xxy \leq 6$" to -- $2 \leq xxy \leq 6$ --
Claim 6, line 8, change "$2 \leq xxy \leq 6$" to -- $2 \leq xxy \leq 6$ --
Claim 14, line 4, change "$2 \leq xxy \leq 6$" to -- $2 \leq xxy \leq 6$ --
Claim 16, line 8, change "$2 \leq xxy \leq 6$" to -- $2 \leq xxy \leq 6$ --
Claim 24, line 4, change "$2 \leq xxy \leq 6$" to -- $2 \leq xxy \leq 6$ --
Claim 26, line 8, change "$2 \leq xxy \leq 6$" to -- $2 \leq xxy \leq 6$ --
Claim 34, line 4, change "$2 \leq xxy \leq 6$" to -- $2 \leq xxy \leq 6$ --
Claim 36, line 8, change "$2 \leq xxy \leq 6$" to -- $2 \leq xxy \leq 6$ --

Signed and Sealed this

Thirteenth Day of February, 2001

Attest:

NICHOLAS P. GODICI

*Attesting Officer*     *Acting Director of the United States Patent and Trademark Office*